UNITED STATES PATENT OFFICE.

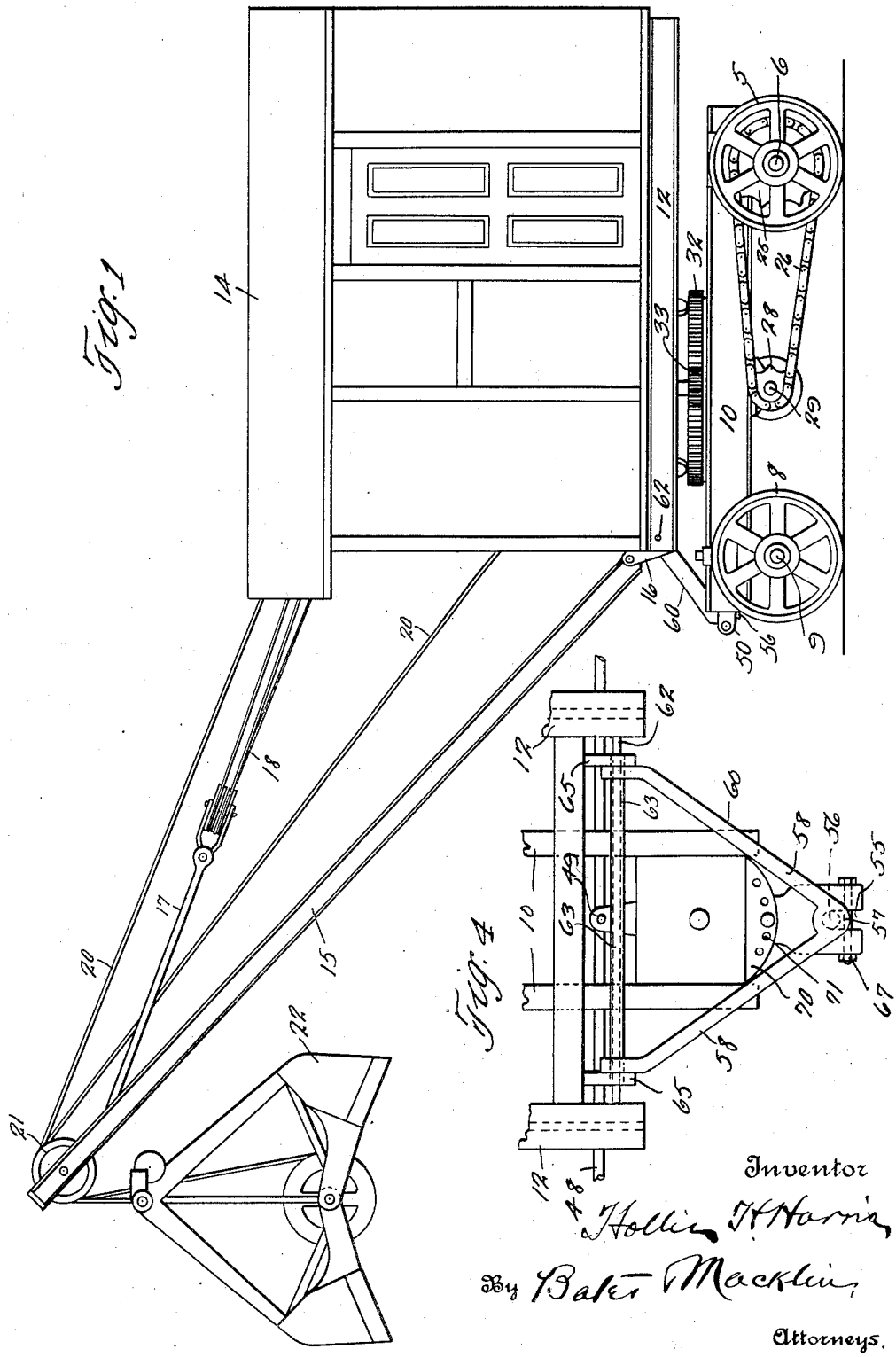

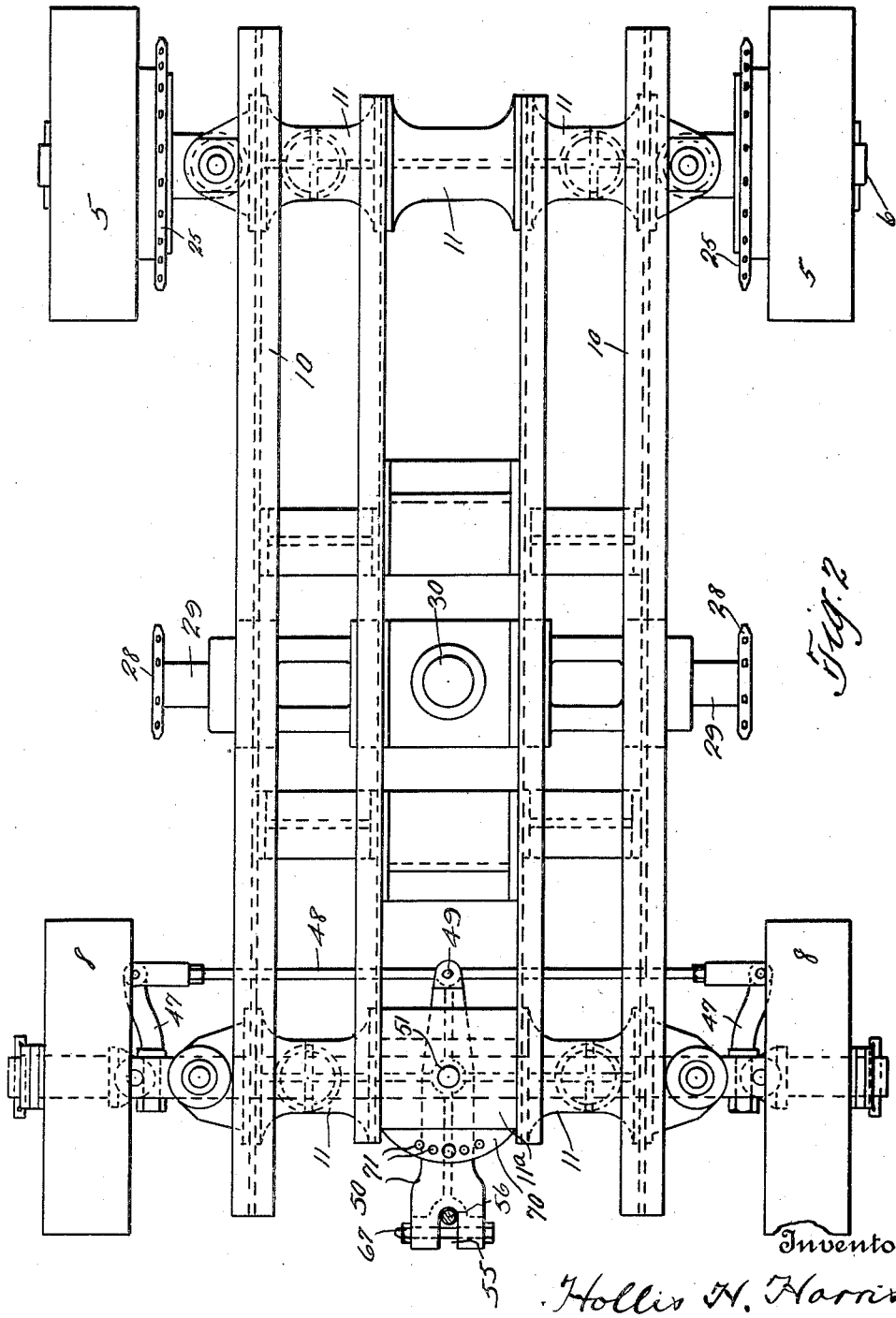

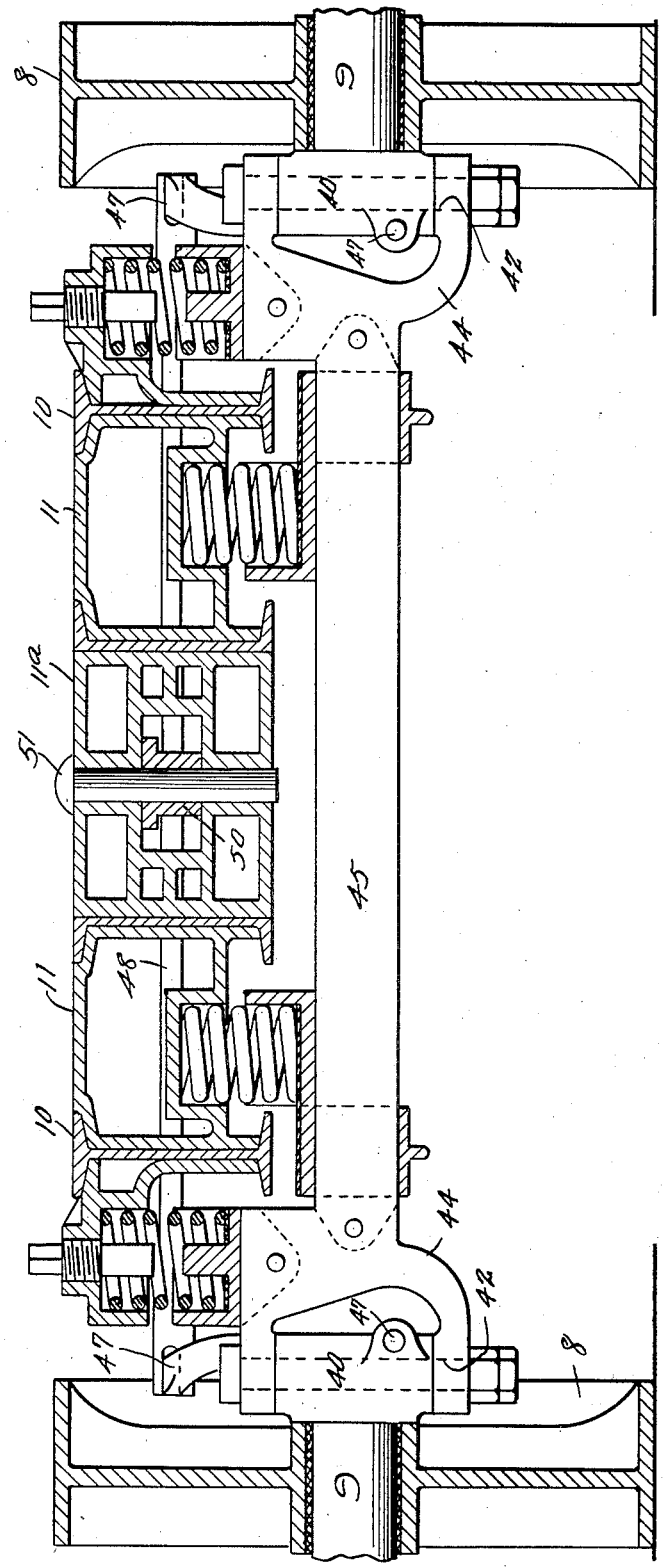

HOLLIS H. HARRIS, OF LORAIN, OHIO, ASSIGNOR TO THE THEW SHOVEL COMPANY, OF LORAIN, OHIO, A CORPORATION OF OHIO.

STEERING MECHANISM FOR SELF-PROPELLED CRANE-TRUCKS.

1,393,119. Specification of Letters Patent. Patented Oct. 11, 1921.

Application filed March 14, 1919. Serial No. 282,551.

*To all whom it may concern:*

Be it known that I, HOLLIS H. HARRIS, a citizen of the United States, residing at Lorain, in the county of Lorain and State of Ohio, have invented a certain new and useful Improvement in Steering Mechanism for Self-Propelled Crane-Trucks, of which the following is a full, clear, and exact description, reference being had to the accompanying drawings.

This invention relates to self-propelled steam cranes, steam shovels and the like, in which a truck supporting a superstructure is self-propelled and provided with steering wheels. The present invention is particularly concerned with steering mechanism whereby the swinging of the frame carrying the boom and superstructure above the truck may automatically turn the wheels of the truck in the same direction. The objects of the invention include particularly the provision of a simple and efficient means for accomplishing such steering, which may be positive in action, durable in service, readily applied to existing steam shovels and the like and requiring minimum changes from the usual structures. More specific objects are made clear from the following description of the invention shown in the drawings herewith. The essential characteristics of the invention are summarized in the claims.

In the drawings, Figure 1 is a side elevation of a steam shovel mounted on a self-propelled truck provided with my mechanism for automatically steering the truck as the superstructure swings; Fig. 2 is a plan of the truck proper just below the superstructure; Fig. 3 is a vertical transverse section of the truck taken on a plane substantially through the axis of the steering wheels; Fig. 4 is a detail in the nature of a plan of a connection between the frame and mechanism for operating the steering wheels.

Describing the parts by the use of reference numerals, 5 indicates driving wheels on an axle 6. 8 indicates the steering wheels on an axle 9. The axles 6 and 9 support a truck frame 10, above which is swivelly mounted a frame 12 carrying a suitable housing indicated at 14 for mechanism for operating a load-engaging device as for example a clam shell bucket. As shown in the drawings, a boom 15 is pivoted at 16 to the frame 12 and braced by a link 17 connected through cables 18 with mechanism, not shown, for raising and lowering the boom. Cables 20 extending over pulleys 21 carried by the boom may operate a clam shell bucket 22.

The driving wheels 5 are shown as provided with sprockets 25 over which suitable sprocket chains 26 may run, the chains being driven by sprockets 28 on a drive shaft 29 mounted in suitable bearing housings and adapted to be driven by any conveniently arranged mechanism actuated through a vertical shaft 30, the shaft 30 extending upwardly into the housing 14 and being operated by driving mechanism therein.

The frame 10 is shown as comprising longitudinal structural members in the form of I-beams or channels connected at their rear ends by castings or other members 11 over the axles and support on suitable springs. This frame construction and supporting mechanism forms the subject matter of a separate application Ser. No. 282,550 executed on an even date herewith. Rigid with the frame is a large gear 32 with which meshes a pinion 33 driven by a vertical shaft extending upwardly into the housing 14 for swinging the housing and frame 12 with relation to the frame 10 about an axis coincident with the shaft 30 and gear 32.

The shafts 9 for the steering wheels 8 form bearings rigid with steering knuckles 40 embracing vertical pivot pins 42 in yokes 44 of an axle member 45. Extending rearwardly from the knuckle members 40 are rigid arms 47 pivotally connected to a link 48 which is in turn pivoted at 49 to a lever 50. The lever 50 is intermediately pivoted by a pin 51 mounted in one of the transverse frame members, designated 11ª. This frame member preferably comprises a casting with ribs and webs, leaving an opening through which the lever may extend and embrace the pin 51. It will be seen that by turning this lever 50 in either direction it will operate through the link 48 and arms 47 to swing the steering knuckles and turn the steering wheel 8.

To connect the frame 12 of the superstructure with the lever 50 in such a manner that the swinging of the frame and boom may correspondingly turn the wheels 8 through this mechanism, the lever 50 is extended forwardly from its pivot and bifurcated at its forward end to provide a slot 55 for receiving the pin 56 of a connecting bracket 60 between this lever and the frame 12. The pin 56 is mounted in the block 57 formed by the junction of two downwardly sloping and converging arms 58 pivoted at their upper ends on a rod 62 mounted transversely of the frame 12 at its forward end and forming a pivot about which the arms 58 may swing as required by the relative movement of the frame 12 and truck frame, due to certain yielding characteristics and looseness of the mounting of the superstructure. A sleeve 63 is shown as surrounding the rod 62 and spacing the inner ends of the arms 58, while this rod or shaft 62 is shown as carried by brackets 65 engaging the outer sides of the ends of the arms 58. The pin 56 is prevented from becoming disengaged from the bifurcated end of the lever 50 by a transverse pin or bolt 67 extending through the lever just ahead of the pin 56.

Formed on the casting 11ª is an arcuate plate 70 provided with a series of openings 71 through which a pin may be extended into a corresponding opening in the lever 50 to lock this lever in any of a number of positions.

The operation of the device may be summarized as follows: Assuming that the truck is being propelled through the driving mechanism described, the turning of the frame 12 with relation to the truck frame through the gears 33 and 32 causes corresponding movement of the bracket 60 and lever 50, thus actuating the link 48 and steering knuckles and swinging the wheels 8 in the same direction. That is, if the boom is turned to the right the forward portion of the lever 50 is correspondingly moved to the right, and the arms 47 are then swung to the left, turning the wheels 8 to the right, so that if the truck was moving the boom forward the entire truck and superstructure would turn to the right, as desired. Correspondingly if the boom is swung to the left the wheels 8 would be turned to steer the truck to the left.

In some classes of excavation work it is desirable to move the truck in an arc as the work progresses. On such an occasion the operation may be facilitated by disengaging the frame 12 from the steering mechanism by disconnecting the pin 56 on the bracket 60 from the lever 50 and setting the lever 50 at the proper angle and securing the same by a pin through the opening 71 and through the lever.

Having thus described my invention what I claim is:—

1. A truck frame having steering wheels mounted on individual steering knuckles, means connected with the steering knuckles, an operating lever connected with said means, a superstructure carried by the frame and adapted to turn thereon, and means connecting the lever to the superstructure through a lost motion connection to turn the wheels consequent upon the turning of the superstructure.

2. In a truck, the combination of driving wheels and steering wheels, a rigid axle, steering knuckles connected therewith by vertical pivots, journals formed thereon for the steering wheels, operating arms for the steering knuckles, an intermediately pivoted lever, a transverse member on the truck carrying said pivot at a point substantially midway between the said steering wheels, said lever extending forwardly therefrom, the superstructure swiveled on the frame, a rigid member pivoted on a horizontal axis to the superstructure and having a driving connection with said lever, whereby moving the frame may move the steering wheels.

3. The combination, with a self-propelled truck, of a superstructure swivelly mounted thereon, steering wheels for the truck, steering knuckles therefor, a rigid axle carrying the steering knuckles, and lever mechanism for operating the steering knuckles including a lever having a bifurcated end, a bracket attached to the superstructure having a pin engaging said bifurcated end of said lever for operating the steering mechanism as the superstructure swings.

4. The combination, with a self-propelled truck, of a superstructure swivelly mounted thereon, steering wheels for the truck, steering knuckles therefor, a rigid axle carrying the steering knuckles, arms connected with the knuckles, a lever linked to the arms, said lever projecting forwardly from the truck and having a bifurcated forward end, a bracket attached to the superstructure having a pin engaging said bifurcated end of said lever for operating the steering mechanism as the superstructure swings.

5. A self-propelled truck having steering wheels mounted on steering knuckles, means for operating the steering knuckles including arms rigid with the steering knuckles, link means extending to the central portion of the truck, a lever pivoted to the truck frame, an arcuate series of openings arranged about the pivot of the lever, an opening in the lever adapted to register therewith, a superstructure swiveled to the truck and means carried thereby and adapted to be removably connected with said lever.

6. In a truck, the combination of a frame, individual steering knuckles having steering wheels mounted thereon, an operating member connected with said knuckles, a superstructure carried by the frame and adapted to turn thereon and having a boom and raising mechanism, and means connecting the superstructure to the operating member, whereby the steering wheels may be turned with the superstructure.

In testimony whereof, I hereunto affix my signature.

HOLLIS H. HARRIS.